Patented Aug. 22, 1950

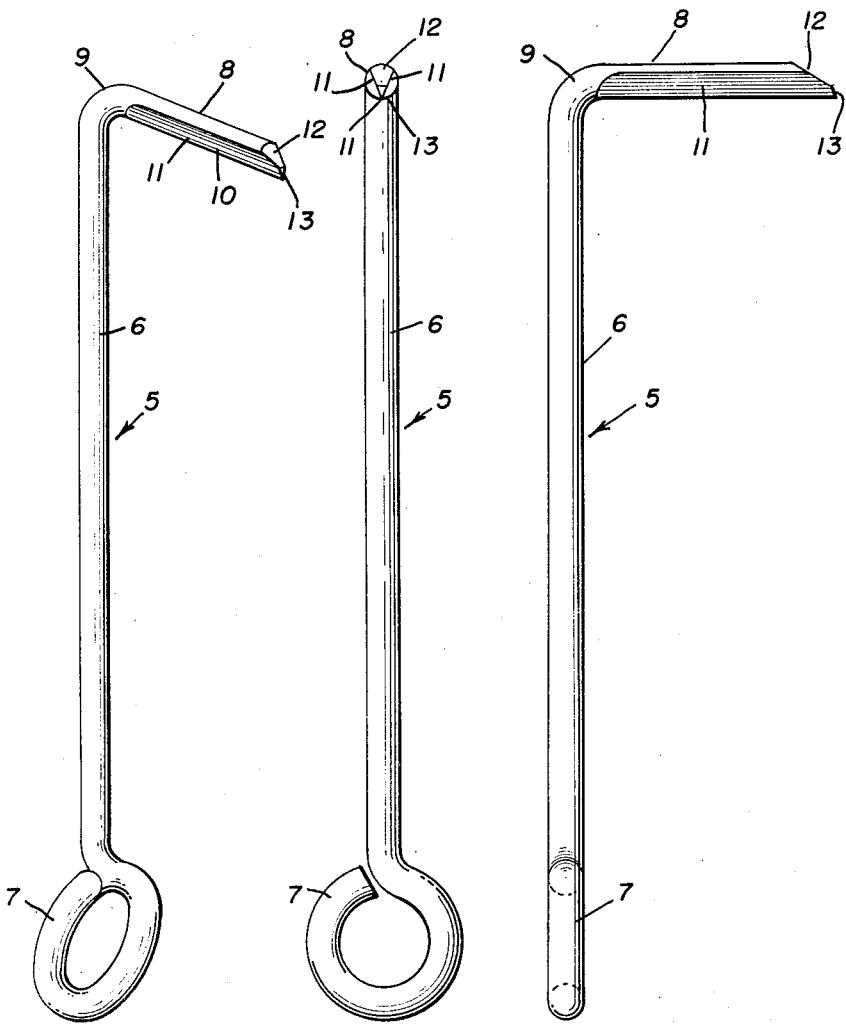

2,519,766

UNITED STATES PATENT OFFICE 2,519,766

TRASH KNIFE

Forest W. Johnson, Mechanicsville, Iowa

Application July 1, 1947, Serial No. 758,264

1 Claim. (Cl. 30—317)

The present invention relates to a novel hand tool which takes the form of a so-called trash knife, and which is expressly designed for dislodging and cutting vegetable trash, such as wraps itself around and becomes entangled with parts of agricultural machinery.

It is matter of common knowledge that tough grass, weeds, twigs and the like entwine and wind themselves into matted mass formations, during the operation and use of such machines as corn plows, corn pickers, hay balers and rakes, combines, hay loaders and the like. When the conglomerated mass includes windings of vines, roots and stalks, it not only slows down the operation of movable parts, but sets up a condition requiring stoppage of the machine until, with some makeshift implement or device, said mass is dislodged and freed from the machinery. Makeshift implements, such as are currently used, are unhandy and necessitate the exercise of painstaking care, with consequent loss of time and patience, during usage. It follows, therefore, that the purpose of the instant invention is to provide a tool which is such in construction that it may be advantageously and handily employed to satisfactorily attain the ends wanted.

Needless to say, I am sufficiently conversant with the problems of the farmer to full well appreciate that "any old tool" with a handle and blade, will not serve the desired ends. With such factors in mind, I have evolved and produced a simple and practical tool, whose parts are such and so arranged that they provide a tool which is aptly and otherwise capable of fulfilling the requirements of the user.

Other objects and advantages will become more readily apparent from the following description and the accompanying illustrative drawings.

In the drawings, wherein like numerals are employed to designate like parts throughout the views:

Figure 1 is a perspective view of a trash cutting and dislodging tool, constructed in accordance with the principles of the present invention.

Figure 2 is an elevational view, observing Figure 1 in a direction from right to left.

Figure 3 is a side elevational view, as is obvious.

Referring now to the drawings by distinguishing reference numerals, the improved tool is of one-piece form and is fashioned from heavy round-rod stock, said tool being denoted, as a unitary device, by the numeral 5. The numeral 6 denotes a shank which, it will be noted, is of appropriate length and is rectilinearly straight from end to end. Said shank, at its inner end, the end closest to the user when in use, is provided with an eye 7 providing a convenient finger accommodation ring. At its outer or opposite end, said shank is bent laterally to provide a dislodging and cutting member 8, the same being bent from the end of the shank, as at 9, to assume a right angular position. That is to say, the member 8 is at a ninety degree angle in respect to the longitudinal center of axis of the shank 6. Opposite edges of said member 8 are bevelled as at 10, and these define a cutting edge 11, which, it will be noted, extends the full length of said member 8. For convenience, the member 8 may be referred to as a knife. The outer terminal end of the knife is bevelled as at 12, said bevel being at an acute angle with respect to the longitudinal axis of the blade proper, and serving, in conjunction with the other portions, to define a piloting nose or point 13.

As set forth in the introductory portion of the specification, I am not unmindful that implements and tools of all varieties and types have been employed for cutting corn, stripping insulation, thinning fruit and so on and so forth; that prior art devices include shank portions, handle portions and blade portions of varying degrees, shapes, and relative position. To the best of my knowledge and belief, no tool or implement has been offered or provided for the express purpose of cutting, dislodging and disposing of accumulated trash on parts of agricultural machines. In connection with my tool, it will be noted that the shank 6 is long and sturdy, that the gripping portion is a simple eye, that the eye is at right angles to the longitudinal axis of the blade. The blade is straight from end-to-end, has a cutting edge throughout its entire length, and is at right angles to the longitudinal axis of the shank. The terminal or outer end portion of the blade has the special bevel 12 terminating in a nose 13, which facilitates digging in and loosening wrappings, twigs, roots, and so on and so forth. It follows, therefore, that this tool is ideally suited for the intended purposes.

A careful consideration of the foregoing description of the invention in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention what is claimed as new is:

A heavy duty cutting implement for forcibly lashing, severing, loosening, dislodging and removing tangled and accumulated weeds and trash from parts on agricultural machines and the like, comprising a relatively long rigid shank of such length that it may be bodily swung with requisite leverage and thus manipulated with required force, said shank having an integral eye at one end, said eye being of a diameter sufficient to provide a finger encircling grip, said shank being provided at its opposite end with a right angularly disposed heavy duty debris dislodging and cutting blade, said eye being in a plane at right angles to the longitudinal axis of said blade, said blade being substantially V-shaped in cross-section of substantial length, though short in relation to said shank, and embodying a longitudinally extending cutting edge which extends approximately the full length of the blade, the free end portion of said blade terminating in a bevel which is oblique to the longitudinal axis of the blade, said bevel merging into an axially protruding tip portion between itself and the cutting edge and defining a blade piloting and penetrating point.

FOREST W. JOHNSON.

REFERENCES CITED

The following references are of record in the file of this patent:

UNITED STATES PATENTS

| Number | Name | Date |
| --- | --- | --- |
| 1,328,964 | Penn | Jan. 27, 1920 |
| 1,488,326 | Dubee | Mar. 25, 1924 |
| 1,519,228 | Weber | Dec. 16, 1924 |
| 2,019,357 | Oestreich | Oct. 29, 1935 |